United States Patent [19]

Shibata et al.

[11] Patent Number: 4,770,146

[45] Date of Patent: Sep. 13, 1988

[54] APPARATUS AND A METHOD FOR DIAGNOSING AN EXHAUST GAS PURIFICATION SYSTEM

[75] Inventors: Norio Shibata, Toyota; Nobuki Uchitani, Tokushima, both of Japan

[73] Assignee: Toyota Jidosha Kabushiki Kaisha, Aichi, Japan

[21] Appl. No.: 98,562

[22] Filed: Sep. 21, 1987

[30] Foreign Application Priority Data

Oct. 1, 1986 [JP] Japan ................. 61-233828

[51] Int. Cl.$^4$ ............................................. F02D 41/22
[52] U.S. Cl. ..................................... 123/479; 123/494; 123/571; 364/431.11; 73/118.1
[58] Field of Search ............... 123/437, 438, 440, 478, 123/479, 480, 494, 570, 571; 73/118.1, 119 A; 364/431.11

[56] References Cited

U.S. PATENT DOCUMENTS

| | | | |
|---|---|---|---|
| 4,163,282 | 7/1979 | Yamada et al. | 123/570 X |
| 4,583,176 | 4/1986 | Yamato et al. | 364/431.11 |
| 4,587,615 | 5/1986 | Takahashi | 123/479 X |
| 4,601,199 | 7/1986 | Denz | 364/431.11 X |
| 4,604,701 | 8/1986 | Fujawa et al. | 364/431.11 X |
| 4,695,941 | 9/1987 | Kumar | 364/431.11 X |
| 4,704,685 | 11/1987 | Martinsons et al. | 364/431.11 |

FOREIGN PATENT DOCUMENTS

| | | | |
|---|---|---|---|
| 0200665 | 12/1982 | Japan. | |
| 0030446 | 2/1983 | Japan. | |
| 0030446 | 2/1983 | Japan. | |
| 0101244 | 6/1983 | Japan | 123/479 |
| 0055443 | 3/1987 | Japan. | |

Primary Examiner—Willis R. Wolfe
Attorney, Agent, or Firm—Parkhurst & Oliff

[57] ABSTRACT

A diagnosing apparatus for diagnosing first and second vacuum switches and a throttle switch of an exhaust gas purification apparatus. The diagnosing apparatus includes first and second vacuum switches, a throttle switch, an engine speed sensor, and a computer. The second vacuum switch outputs a signal when the value of vacuum is greater than 80 mm Hg vacuum. The second vacuum switch outputs a signal when the value of vacuum is less than 350 mm Hg vacuum. The throttle switch outputs a signal when the throttle valve is open more than 9 degrees. The engine speed sensor detects an engine revolution number. A predetermined relationship is stored in the computer of the diagnosing apparatus and the relationship includes at least three ranges or areas. The computer determines whether the detected engine revolution number is within a first range when the output of the second vacuum switch is contrary to an output forecasted or predicted in accordance with the outputs of the first vacuum switch and the throttle switch on the basis of the predetermined relationship, whereby the diagnosing apparatus does not diagnose any of switches as out of order when the engine revolution number is within the first or range.

24 Claims, 4 Drawing Sheets

APPARATUS AND A METHOD FOR DIAGNOSING AN EXHAUST GAS PURIFICATION SYSTEM

BACKGROUND OF THE INVENTION

The present invention relates to a diagnosing apparatus and a method for diagnosing apparatuses of an exhaust gas purification system.

More particularly, the present invention relates to improvements in a diagnosing apparatus and a method for diagnosing apparatuses of an exhaust gas purification system which is operated to purify exhaust gas in accordance with output signals outputted from vacuum switches. The vacuum switches are connected to an intake manifold which is used for an engine with a carburator of a vehicle.

A first conventional diagnosing apparatus, which uses a high grade computer, can easily diagnose several apparatuses of the exhaust gas purification system, however, a second conventional diagnosing apparatus, which uses a low grade computer, cannot diagnose the several apparatuses of the exhaust gas purification system, because of the low capacity level of the low grade computer.

An engine with a carburator, which is mounted in a vehicle, usually uses the second type of conventional diagnosing apparatus, because the cost of the vehicle can be decreased. The engine with the carburator uses engine load sensors (e.g., vacuum switches) for generating signals to the second conventional diagnosing apparatus, and the second conventional diagnosing apparatus diagnoses the engine load sensors on the basis of the generated signals of the engine load sensors.

A similar conventional diagnosing apparatus is disclosed in Japanese Patent Laid Open No. 57-200665. The conventional apparatus diagnoses a pressure sensor for increasing fuel in an exceeding supply condition by a turbo charger in accordance with a relationship between output signals from the pressure sensor, a throttle valve opening sensor and/or an air flow sensor.

A similar conventional diagnosing apparatus is disclosed in Japanese Patent Laid-Open No. 58-30446. This apparatus diagnoses an $O_2$ sensor, however the apparatus is prevented from diagnosing the $O_2$ sensor when the atmospheric pressure is below a predetermined value.

The conventional diagnosing apparatus indicates the results of diagnoses (i.e., the diagnosis) by on-and-off lamps. When the conventional apparatus diagnoses one of apparatuses of the exhaust gas purification system as out of order or when the conventional apparatus detects an abnormal condition of a control apparatus of the exhaust gas purification system, one of the on-and-off lamps corresponding to said one of the apparatuses is turned on.

As mentioned above, the engine with the carburator uses the vacuum switch, and the second conventional diagnosing apparatus diagnoses normally on the basis of the output signal of the vacuum switch when the vehicle drives on a usual low ground (i.e., drives at a low altitude).

On the other hand, when the vehicle drives at a high altitude (i.e., on a high ground), the intake manifold pressure is decreased, even if the engine outputs the same output power, because the atmospheric pressure at a high altitude is lower than that at a low altitude.

Accordingly, at high altitudes, the vacuum switch or sensor generates the signal under different conditions than the conditions under which the vacuum switch generates the signal at low altitudes.

As a result, the second conventional diagnosing apparatus cannot normally diagnose the apparatus of the exhaust gas purification system, because the apparatus of the exhaust gas purification system is diagnosed on the basis of the vacuum switch. And, in a case of diagnosing the vacuum switch itself, also the second conventional diagnosing apparatus cannot normally diagnose the vacuum switch, because the second conventional diagnosing apparatus uses the predetermined relationship for diagnosing the vacuum switch. Namely, at high altitudes, the second conventional diagnosing apparatus might diagnose the apparatus of the exhaust gas purification system and the vacuum switch as out of order on the basis of the output signal even if the apparatus of the exhaust gas purification system and the vacuum switch are operating normally.

In order to prevent the second conventional diagnosing apparatus from incorrectly diagnosing the apparatus of the exhaust gas purification system and the vacuum switch or the engine load sensors, on the high ground, (i.e., at a high altitudes) the high grade detecting apparatuses may be used, but their costs are extremely high.

SUMMARY OF THE INVENTION

The present invention was developed in view of the foregoing background and to overcome the foregoing drawbacks. It is accordingly an object of this invention to provide a diagnosing apparatus which can diagnose an apparatus of an exhaust gas purification system which includes a vacuum switch or an engine load sensor without high cost parts even if a vehicle drives at a high altitude.

To achieve accurate diagnoses on the high ground, (i.e., at a high altitude), a diagnosing apparatus is provided for diagnosing at least three sensors of an exhaust gas purification system. The diagnosing apparatus includes first and second vacuum switches, a throttle switch, an engine speed sensor, a predetermined stored relationship and a determining means.

The first vacuum switch detects a value of vacuum within an intake manifold of an engine. The first vacuum switch generates an output signal when the value of vacuum is greater than a first predetermined value of vacuum. (e.g., 80 mm Hg vacuum).

The second vacuum switch detects the value of vacuum within the intake manifold of the engine. The second vacuum switch generates a signal when the value of manifold is less than a second predetermined value of vacuum. (e.g., 350 mm Hg vacuum).

The throttle switch detects the degree of opening of the throttle valve.

The throttle switch generates a signal when the degree of opening of the throttle valve is greater than a predetermined degree of opening. (e.g., 9 degree).

An engine speed sensor detects an engine revolutional speed (i.e., g the number of engine revolutions).

A predetermined relationship is stored or memorized in a memory means, and the relationship includes at least three areas or ranges.

A determining means determines whether the detected engine revolutional speed is less than a first predetermined engine revolutional speed when the signal of the second vacuum switch is contrary to a signal forecasted in accordance with the signals of the first and third vacuum switches on the basis of the predetermined relationship. Then, the diagnosing apparatus diagnose any sensor as a normal condition when the engine revolutional speed is less than the first predetermined engine revolutional speed.

Accordingly, even when diagnosing apparatus cannot accurately diagnose any switch because it is possible that the vehicle drive at a high altitude, the diagnosing apparatus diagnoses accurately the first and second vacuum switches and the throttle switch. As a result, the diagnosing apparatus can diagnose accurately the apparatus of the exhaust gas purification system which is diagnosed on the basis of the signal of the vacuum switch, because the vacuum switch is diagnosed accurately.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements.

DETAILED DESCRIPTION OF THE PREFERRED EMBODIMENTS

The present invention will be described in detail with reference to the accompanying drawings which illustrate a preferred embodiment according to the present invention.

Figure 1:
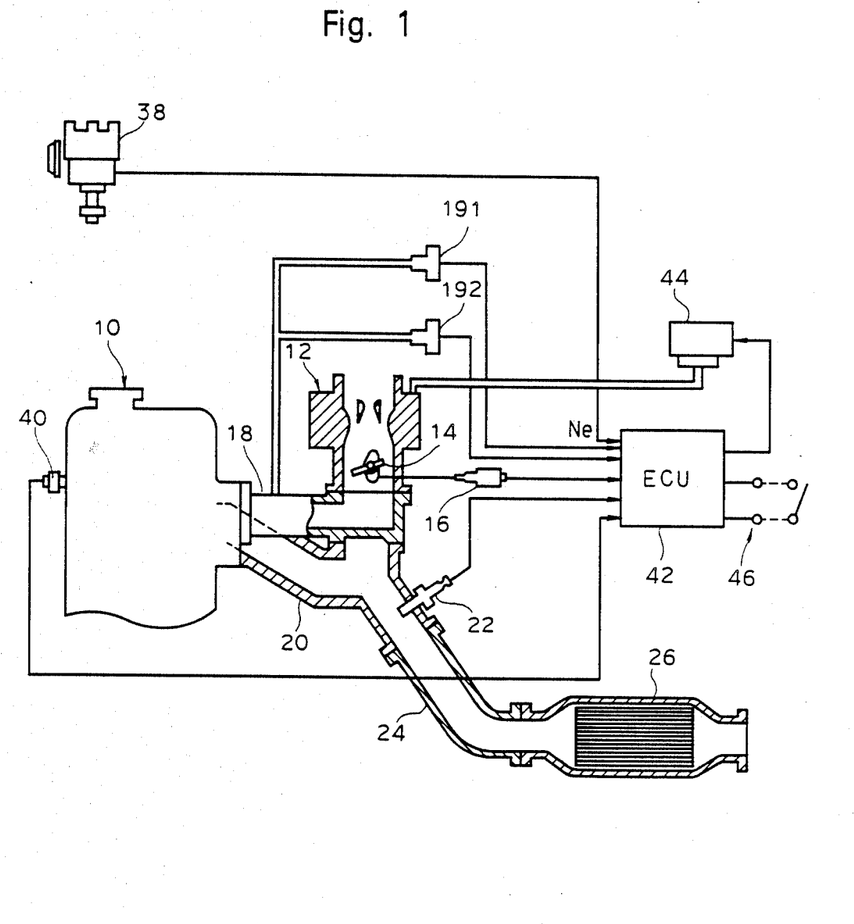
FIG. 1 is a schematic view of an exhaust gas purification system of an engine with a carburetor, in which a diagnosing apparatus according to the present invention is employed.

Referring to FIG. 1, an engine 10 includes a carburetor 12, an intake manifold 18 and an exhaust manifold 20. The carburetor 12 includes a throttle valve 14 and a power increasing mechanism (not shown in drawings), (e.g., a power valve or a secondary valve).

A throttle switch 16 detects the opening angle of the throttle valve 14, the throttle switch 16 is turned OFF when the opening angle of the throttle valve 14 is less than 9 degrees. On the other hand, when the opening angle of the throttle valve 14 is equal to or greater than 9 degrees, the throttle switch 16 is turned ON.

The intake manifold is located to a down stream of the carburetor 12 and connected thereto. A first vacuum switch 191 and a second vacuum switch 192 are connected to the intake manifold 18. These first and second vacuum switches 191 and 192 output signals to an electronic controlling unit (i.e., ECU) 42. The electronic controlling unit 42 stores or memorizes a condition (i.e., a determining area or range) in which the diagnosing apparatus diagnoses apparatuses of the exhaust gas purification system (e.g., an air-fuel ratio feed back apparatus or an exhaust gas recirculation apparatus).

The first vacuum switch 191 is turned ON when the value of vacuum is equal to or greater than 80 mm Hg, and the first vacuum switch 191 is turned OFF when the value of vacuum is less than 80 mm Hg.

On the other hand, the second vacuum switch 192 is turned OFF when the value of vacuum is greater than 350 mm Hg, and the second vacuum switch 192 is turned ON when the value of vacuum is equal to or less than 350 mm Hg. A fuel-air mixture is produced in the carburetor 12, and the fuel-air mixture is introduced into a combustion chamber (not shown in drawings) of the engine 10 through the intake manifold 18. After burnt, the exhaust gas is exhausted through the exhaust manifold 20.

An oxygen density sensor 22 (i.e., $O_2$ sensor) is located down-stream of the exhaust manifold 20, and the $O_2$ sensor 22 detects the air-fuel ratio on the basis of an oxygen density in a remainder of the exhaust gas.

An exhaust pipe 24 is located to the downstream of the exhaust manifold 20 and connected thereto, and an exhaust gas purification means (e.g., a three-way catalytic converter 26) is located downstream of the exhaust gas pipe 24 and connected thereto.

The electronic control unit (i.e., ECU) 42 receives an ignition primary coil current from a distributor 38, output signals from the first and second vacuum switches 191 and 192, an output signal from the throttle switch 16, an output signal from the $O_2$ sensor 22, a signal outputted from a temperature switch 40 for detecting the temperature of engine cooling water, and an output switch from a "L" terminal switch of a voltage regulator (not shown in drawings). The "L" terminal switch is turned ON when an ignition key switch (not shown in drawings) in ON and when the engine is running. On the other hand, the "L" terminal switch is OFF when the engine is stopped.

After processing the inputted data, the ECU 42, the ECU 42 produces a feed back control signal "Vf", and detects the engine revolutional speed "Ne" on the basis of the ignition primary coil current from the distributor 38.

An electric bleed control valve 44 is actuated by the feed back control signal "Vf", and the amount of air bleed to be supplied to the carburetor 12 is varied in accordance with the feed back control signal "Vf". Accordingly, the air-fuel ratio is controlled in a suitable condition.

Further, a check terminal 46 is provided within the ECU 42 for checking the diagnosis indication of the diagnosing apparatus. A check switch (not shown in drawing) may be used instead of the check terminal 46.

Figure 2:
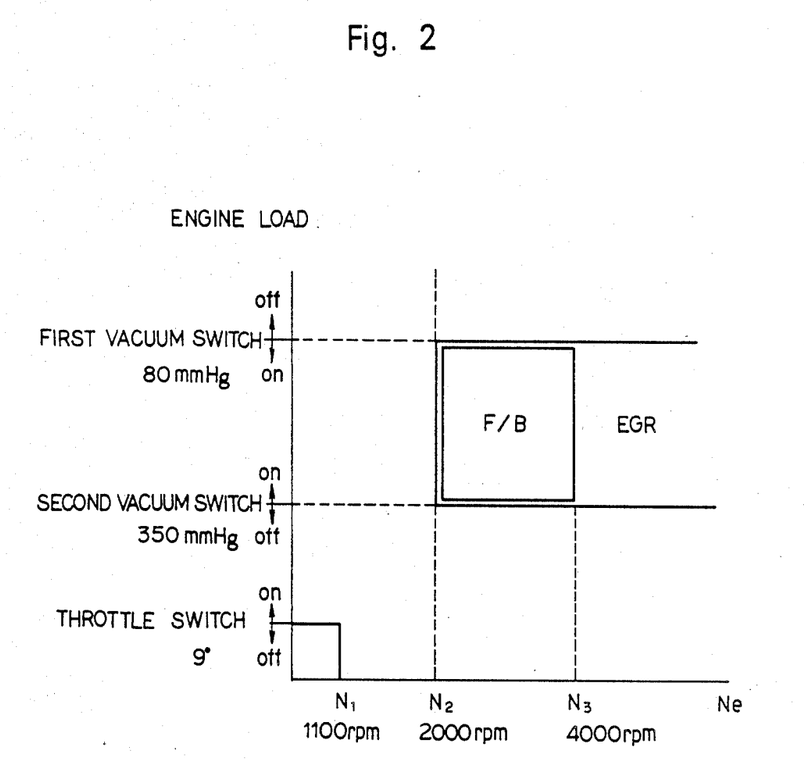
FIG. 2 is a predetermined relationship for diagnosing apparatuses of the exhaust gas purification system of the engine with the carburetor.

FIG. 2 shows a map or a relationship stored or memorized in a memory (not shown in drawings) of the ECU 42 for diagnosing the apparatus of the exhaust gas purification system of the engine 10 with the carburetor 12.

FIG. 2 shows the determining area or range (i.e., EGR in FIG. 2) for diagnosing an exhaust gas recirculation apparatus. Factors used in the diagnosis of the exhaust gas recirculation apparatus are temperature of the exhaust gas supplied to the intake manifold 18 from the exhaust gas recirculation apparatus and the engine operating condition.

Also, FIG. 2 shows the determining area or range (i.e., F/B in FIG. 2) for diagnosing the feed back control apparatus of the air-fuel ratio.

The engine operating condition is detected on the basis of the output signal from the second vacuum switch 192.

When both of the detected engine operating condition (i.e., an engine load) and the detected engine revolutional speed (i.e., Ne) are positioned within at least one of the determining areas or ranges (i.e., F/b and EGR in FIG. 2), the diagnosing apparatus can diagnose accurately one of the feed back control apparatus and the exhaust gas recirculation apparatus.

These determining areas or ranges are predetermined experimentally and memorized or stored in a memory.

Accordingly, as shown in FIG. 2, the diagnosing apparatus can diagnose accurately the feed back control apparatus when the first and second vacuum switches 191 and 192 and the throttle switch 16 are turned ON and when the engine revolutional speed "Ne" (i.e., number of engine revolutions) is between 2000 rpm and 4000 rpm. The diagnosing apparatus can diagnose accurately the exhaust gas recirculation apparatus (EGR) when the first and second vacuum switches 191 and 192 and the throttle switch 16 are turned ON, and when the engine revolution number "Ne" is equal to or greater than 2000 rpm.

When one of the sensors including the first and second vacuum switches 191 and 192 and the throttle switch 16 is turned ON, a code "1" is given. On the other hand, when one of the sensors is turned OFF, a code "0" is given.

Accordingly, when the first and second vacuum switches 191 and 192 and the throttle switch 16 generate ON signals and an indicator (not shown in drawings) indicates a code "111", the sensors 191, 192 and 16 are diagnosed as normal conditions, because it is possible that a condition, which indicates the code "111", takes the position on the relationship, (i.e., the detected values are positioned within the predetermined determining area or range on the relationship).

On the other hand, when the sensors 191, 192 and 16 generate OFF signals and the indicator indicates a code "000", the diagnosing apparatus diagnoses the sensors 191, 192 and 16 are out of order, because it is possible that a condition which indicates a code "000" take the position on the relationship. In such a case, the first vacuum switch 191 is diagnosed as out of order, because it it possible to suppose that two sensors 191 and 192 cannot get out of order at the same time.

On a usual low ground, (i.e., at low altitudes) the indicator indicates a code "100" when the engine 10 is idling, because the first vacuum switch 191 in ON, the second vacuum switch 192 is OFF and the throttle switch 16 is OFF. When the opening angle of the throttle valve 14 is increased in the condition that the engine revolutional speed "Ne" is below 1100 rpm (i.e., "N₁" in FIG. 2), the indicator indicates one of codes "101", "111" or "011".

Accordingly, when in the above mentioned condition, a code excluding "100", "101", "111" or "011" is indicated, at least one of the sensors 191, 192 and 16 is diagnosed as out of order.

However, ona high ground (i.e., at high altitude), the idling intake pressure is decreased, so that the indicator can indicate the code "110" and all of the sensors 191, 192 and 16 being out of order.

On the other hand, even if the vehicle drives on the high ground, when the indicator indicates the code "110" and when the engine revolutional speed "Ne" is greater than a predetermined revolutional speed, one of the sensors 191, 192 and 16 could be diagnosed as out of order. For example, if the second vacuum switch 192 is continuously connected during deceleration of a vehicle or if the throttle switch 16 is continuously opened during the load running of the engine 10, then if the indicator indicates the code "110", the diagnosing apparatus diagnoses one of the sensors 191, 192 and 16 as out of order.

Figure 3:
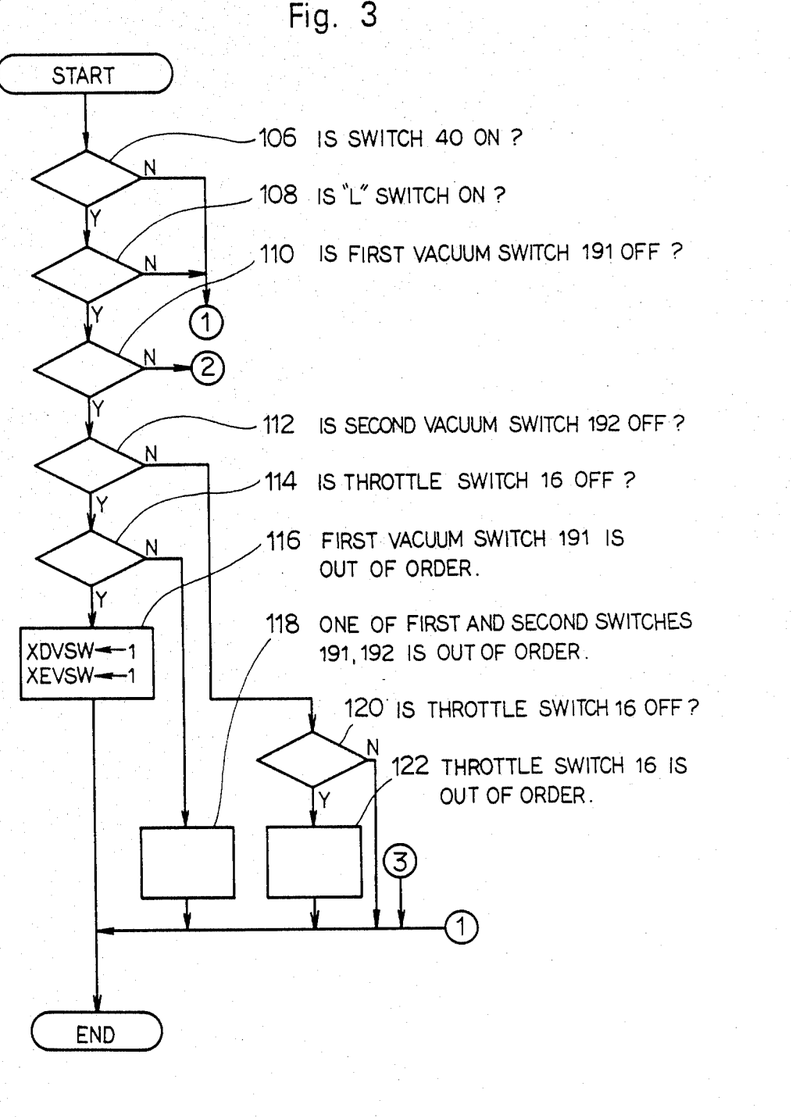
FIG. 3 is the first part of a flow chart of a method for diagnosing the apparatuses of the exhaust gas purification system.
Figure 4:
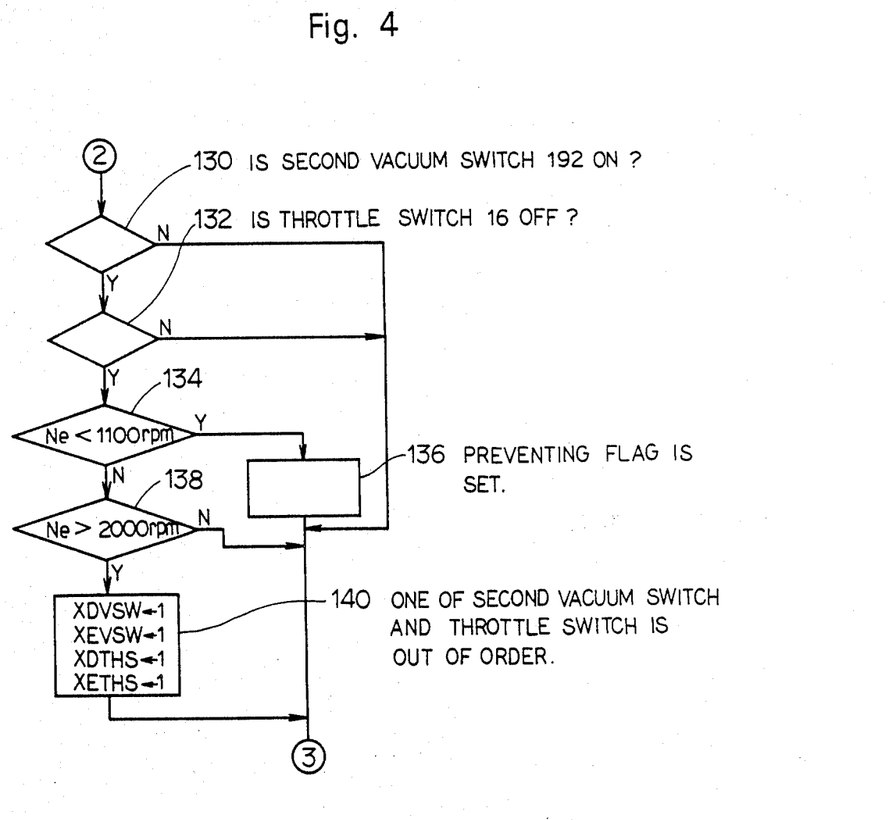
FIG. 4 is the second part of the flow chart of the method for diagnosing the apparatuses of the exhaust gas purification system.

FIGS. 3 and 4 show a flow chart (i.e., determininig routine) of a method or algorithm for diagnosing the sensors 191, 192 and 16.

The method is stored or memorized in the ECU 42.

First of all, a step 106 determines whether the cooling water temperature switch 40 is ON. When the switch 40 is ON, a step 108 is processed. On the other hand, when the switch 40 is OFF, the determining routine is finished.

The step 108 determines whether the "L" terminal switch is ON (i.e., the code "1"). When the "L" terminal switch is ON (i.e, the engine 10 is operating), a step 110 is processed. On the other hand, when the "L" switch is OFF, the determining routine is finished.

The step 110 determines whether the first vacuum switch 191 is OFF (i.e., the code "0"). In the relationship shown in FIG. 2, when the first vacuum switch 191 is OFF (i.e., the code "0"), the second vacuum switch 192 should be ON (i.e., the code "1") and the throttle switch 14 should be ON (i.e., the code "1").

When the first vacuum switch 191 is OFF, a step 112 is processed. On the other hand, when the first vacuum switch 191 is ON, a step 130 shown in FIG. 4 is processed.

The step 112 determines whether the second vacuum switch 192 is OFF (i.e., the code "0"). When the second vacuum switch 192 is OFF (i.e., the second vacuum switch 192 generates a contrary signal to the signal forecasted or predicted based upon the signal of the first vacuum switch 191), a step 114 is processed. On the other hand, if the second vacuum switch 192 is ON, a step 120 is processed.

In the step 112, when the second vacuum switch 192 is OFF, the diagnosing apparatus diagnoses one of the first and second vacuum switch 191 and 192 as out of order. (i.e., the first vacuum switches 191 is continuously OFF or the second vacuum switch 192 is continuously OFF).

The step 114 determines whether the throttle switch 16 is OFF (i.e., the code "0"). When the throttle switch 16 is OFF, a step 116 is processed. On the other hand, when the throttle switch 16 is ON, a step 118 is processed.

In the step 114, when the throttle switch 16 is OFF, the signal of the throttle switch 16 is not contrary to the signal of the second vacuum switch 192, and only the signal of the first vacuum switch 191 is contrary to the signal forecasted of the basis of the signals of the throttle switch 16 and the second vacuum switch 192.

The step 116 determines that the first vacuum switch 191 is out of order and the step 116 sets flags "XDVSW" and "XEVSW". Then, the determining routine is finished. When the flags "XDVSW" and "XEVSW" are set, the indicator (i.e., a diagnosis lamp) is lit.

In the step 114, when the throttle switch 16 is ON, there is a possibility that both of the first and second vacuum switches 191 and 192 are out of order.

The step 118 determines that one of the first and second vacuum switches 191 and 192 is out of order, and then the determining routine is finished.

In the step 112, when the second vacuum switch 192 is ON (i.e., the code "1"), the signal of the first vacuum switch 191 is not contrary to the signal forecasted on the basis of the signal of the second vacuum switch 192.

The step 120 determines whether the throttle switch 16 is OFF (i.e., the code "0"). When the throttle switch is OFF, a step 122 is processed.

In the step 120, when the throttle switch 16 is OFF, the signals of the first and second vacuum switches 191 and 192 are contrary to a signal forecasted on the basis of the signal of the throttle switch 16.

The step 122 determines that the throttle switch 16 is out of order, and then, the determining routine is finished.

On the other hand, when the step 120 determines that the throttle switch 16 is ON (i.e., the code "1"), none of the signals of the first and second vacuum switches 191 and 192 and the throttle switch 16 is contrary to the remainder of the signals of the sensors 191, 192 and 16. Accordingly, the determining routine is finished.

The step 130 determines whether the second vacuum switch 192 s ON (i.e., the code "1"). When the second vacuum switch 192 is ON, a step 132 is processed. On the other hand, when the second vacuum switch 192 is OFF (i.e., the code "0"), the signal of the first vacuum switch 191 is not contrary to a signal forecasted on the basis of the signal of the second vacuum switch 192, then the determining routine is finished.

The step 132 determines whether the throttle switch 16 is OFF (i.e., the code "0"). When the throttle switch 16 is OFF, a step 134 is processed. On the other hand, when the throttle switch 16 is ON, the signal of the second vacuum switch 192 is not contrary to the signal forecasted on the basis of the output of the throttle switch 16 and the first vacuum switch 191. Accordingly, the determining routine is finished.

In the step 132, when the throttle switch 16 is OFF, the signal of the second vacuum switch 192 is contrary to the signal forecasted or predicted on the basis of the output of the throttle switch 16 and the first vacuum switch 191.

The step 134 determines whether the engine revolutional speed (i.e., Ne) is less than 1100 rpm (i.e., idling revolutional speed "$N_1$"). When the engine revolutional speed is less than 1100 rpm, there is a possibility that the vehicle is being driven at a high altitude.

Accordingly, a step 136 is processed, and then a preventing flag is set. As a result, the diagnosis of the air-fuel ratio feed back control apparatus and the diagnosis of the exhaust gas recirculation apparatus are prevented. And also the sensors 191, 192 and 16 are not diagnosed.

On the other hand, if the step 134 determines that the engine revolutional speed is equal to or greater than 1100 rpm, a step 138 is processed.

The step 138 determines whether the engine revolutional speed is greater than 2000 rpm. When the engine revolutional speed is greater than 2000 rpm, a step 140 is processed.

On the other hand, when the first step 138 determines that the engine revolutional speed is equal to or less than 2000 rpm and equal to or greater than 1100 rpm, the diagnosing apparatus cannot accurately diagnose any switch, because it is possible that the vehicle drives at a high altitude. Accordingly, the determining routine is finished.

In the step 138, when the engine revolutional speed is greater than 2000 rpm, it is a condition that the vehicle is decelerating or the engine is running on a load.

Accordingly, the step 140 determines that one of the second vacuum switch 192 and the throttle switch 16 is out of order, because the second vacuum switch 192 is broken down on a condition of a continuous connection or the throttle switch 16 is broken down on a condition of a continuous open. Then, flags "XDVSW", XDVSW", "XDTHS", and "XETHS" are set (i.e., "1") and the diagnosis lamps are lit. And then, the determining routine is finished.

It is apparent that the engine operating condition may be detected in accordance with an output signal of the engine revolution instead of the output from the "L" terminal of the voltage regulator.

Also, it is apparent that the engine warming up condition may be detected in accordance with an output signal from a cooling water temperature sensor instead of the output from the cooling water temperature switch 40.

Further, it is apparent that any engine load detecting switch may be employed instead of or in addition to the first and second vacuum switches 191 and 192 and the throttle switch 16.

As described herein, the present invention overcomes the shortcomings of the known art by providing a low cost diagnosing apparatus for diagnosing the parts of the exhaust gas purification system.

While the present invention has been described in its preferred embodiments, it is to be understood that the invention is not limited thereto, and may be otherwise embodied within the scope of the following claims.

What is claimed is:

1. A diagnosing apparatus for diagnosing an exhaust gas purification system, which operates in accordance with a vacuum signal of a vacuum sensor for detecting a value of vacuum within an intake manifold of an engine comprising:
   a first vacuum sensor for generating a signal when the first vacuum sensor detects a first predetermined value of vacuum within the intake manifold of the engine;
   a second vacuum sensor for generating a signal when the second vacuum sensor detects a second predetermined value of vacuum within the intake manifold of the engine, the second predetermined value of vacuum is greater than the first predetermined value of vacuum;
   a throttle sensor for generating a signal when the throttle sensor detects a predetermined opening angle of throttle valve;
   an engine speed sensor for detecting an engine revolutional speed;
   a memory means for memorizing a relationship;
   a determining means for determining whether the detected engine revolutional speed is less than a first predetermined engine revolutional speed, when the signal of the second vacuum sensor is contrary to a signal forecasted in accordance with the signals of the first vacuum sensor and the throttle sensor on the basis of the relationship; and
   means for diagnosing any sensor as normal condition when the detected engine revolutional speed is less than the first predetermined engine revolutional speed.

2. The diagnosing apparatus of claim 1, further comprising a preventing means for preventing from diagnosing at least one of an air-fuel ratio feedback control apparatus and an exhaust gas recirculation apparatus.

3. The diagnosing apparatus of claim 2, wherein said determining means further determines whether the detected engine revolutional speed is less than a second predetermined engine revolutional speed when the signal of the second vacuum sensor is contrary to the signal forecasted in accordance with the signals of the first vacuum sensor and the throttle sensor on the basis of the relationshp, whereby said preventing means prevents from diagnosing at least one of the air-fuel ratio feedback control apparatus and the exhaust recirculation apparatus when the detected engine revolutional speed is less than the second predetermined engine revolutional speed.

4. The diagnosing apparatus of claim 3, wherein the first predetermined engine revolutional speed is greater than the second predetermined engine revolutional speed.

5. A diagnosing apparatus for diagnosing at least three sensors of an exhaust gas purification system comprising:
 a first sensor of the three sensors for detecting a value of vacuum within an intake manifold of an engine, the first sensor outputting a signal when the value of vacuum is greater than a first predetermined value;
 a second sensor of the three sensors for detecting the value of vacuum within the intake manifold of the engine, the second sensor outputting a signal when the value of vacuum is less than a second predetermined value;
 a third sensor of the three sensors for detecting the degree of opening of a throttle valve, the third sensor outputting a signal when the throttle valve is open more than a third predetermined amount;
 a fourth sensor for detecting an engine revolution number;
 a predetermined relationship memorized in the diagnosing apparatus, the relationship including at least three areas; and
 a determining means for determining whether the detected engine revolution number is within a first range when the output of the second sensor is contrary to an output predicted based upon the output of the first and third sensors and said predetermined relationship, whereby the diagnosing apparatus does not diagnose any of three sensors as out of order when the engine revolution number is within the first range.

6. The diagnosing apparatus of claim 5, wherein the first predetermined value is 80 mm Hg vacuum, the second predetermined value is 350 mm Hg vacuum, and the third predetermined value is 9 degrees.

7. The diagnosing apparatus of claim 5, wherein the first range is equal to or greater than 1100 rpm and equal or less than 2000 rpm.

8. The diagnosing apparatus of claim 5, wherein said determining means further determines whether the detected engine revolution number is within a second range when the output of the third sensor is contrary to an output predicted in accordance with the outputs of the first and second sensors on the basis of said predetermined relationship, whereby the diagnosing apparatus diagnoses one of the second and third sensors as out of order when the engine revolution number is within the second range.

9. The diagnosing apparatus of claim 8, wherein the second range is greater than 2000 rpm.

10. The diagnosing apparatus of claim 5, further comprising a preventing means for preventing the diagnosing apparatus from diagnosing a feed back control apparatus and an exhaust gas recycle apparatus.

11. The diagnosing apparatus of claim 10, wherein said determining means further determines whether the detected engine revolution number is within a third range when the output of the third sensor is contrary to an output predicted in accordance with the outputs of the first and second sensors on the basis of the predetermined relationship, whereby the diagnosing apparatus does not diagnose the feed back control apparatus and the exhaust gas recirculation apparatus when the engine revolution number is within the third range.

12. The diagnosing apparatus of claim 11, wherein the third range is less than 1100 rpm.

13. The diagnosing apparatus of claim 11, wherein said determining means further determines whether the detected engine revolution number is within a second range when the output of the third sensor is contrary to an output predicted in accordance with the output of the first and second sensors on the basis of the predetermined relationship, whereby the diagnosing apparatus diagnoses one of the second and third sensors as out of order when the engine revolution number is within the second range.

14. The diagnosing apparatus of claim 13, wherein the first predetermined value is 80 mm Hg vacuum, the second predetermined value is 350 mm Hg vacuum, and the third predetermined value is 9 degrees.

15. The diagnosing apparatus of claim 14, wherein the first range is equal to or greater than 1100 rpm and equal to or less than 2000 rpm, the second range is greater than 2000 rpm, and the third area is less than 1100 rpm.

16. A method for diagnosing at least three sensors of an exhaust gas purification system, which includes a predetermined relationship between outputs of the three sensors comprising:
 detecting an output of a first sensor of the three sensors;
 detecting an output of a second sensor of the three sensors;
 detecting an output of a third sensor of the three sensors;
 detecting an engine revolution number; and
 determining whether the engine revolution number is within a first revolution range when the output of the second sensor is contrary to an output predicted in accordance with the outputs of the first and third sensors on the basis on the predetermined relationship, whereby the method does not diagnose any of three sensors as out of order when the engine revolution number is within the first revolution range.

17. A method of claim 16, wherein the first revolution range is equal to or greater than 1100 rpm and equal to or less than 2000 rpm.

18. The method of claim 16 further comprising a step of;
 determining whether the engine revolution number is within a second revolution range when the output of the third sensor is contrary to an output predicted in accordance with the outputs of the first and second sensors on the basis of the predetermined relationship, whereby the method diagnoses one of the second and third sensors as out of order when the engine revolution number is within the second revolution range.

19. The method of claim 18, wherein the second revolution range is greater than 2000 rpm.

20. The method of claim 16, further comprising a step of:

determining whether the engine revolution number is within a third revolution range when the output of the third sensor is contrary to an output predicted in accordance with the outputs of the first and second sensors on the basis of the predetermined relationship; and preventing the method from diagnosiing a feed back control apparatus and an exhaust gas recycle apparatus, whereby the method does not diagnose the feed back control apparatus and the exhaust gas recycle apparatus when the engine revolution number is withiin the third revolution range.

21. The method of claim 20, wherein the third revolution range is less than 1100 rpm.

22. The method of claim 20 further comprising a step of;

determining whether the engine revolution number is within a second revolution range when the output of the third sensor is contrary to an output predicted in accordance with the outputs of the first and second sensors on the basis of the predetermined relationship, whereby the method diagnoses one of the second and third sensors as out of order when the engine revolution number is within the second revolution range.

23. The method of claim 22, wherein the first revolution area is equal to or greater than 1100 rpm and equal to or less than 2000 rpm, the second revolution area is greater than 2000 rpm, and the third revolution range is less than 1100 rpm.

24. A diagnosing apparatus for diagnosing first and second vacuum switches and a throttle switch of an exhaust gas purification system comprising:

a first vacuum switch for detecting a value of vacuum within an intake manifold of an engine, the first vacuum switch outputting a signal when the value of vacuum is greater than 80 mm Hg vacuum;

a second vacuum switch for detecting the value of vacuum within the intake manifold of the engine, the second vacuum switch outputting a signal when the value of vacuum is less than 350 mm Hg vacuum;

a throttle switch for detecting the degree of opening of a throttle valve, the throttle switch outputting a signal when the throttle value is open more than 9 degrees;

an engine speed sensor for detecting an engine revolution number;

a predetermined relationship memorized in the diagnosing apparatus, the relationship including at least three ranges to be diagnosed; and a determining means for determining whether the detected engine revolution number is within a first range of the three ranges when the output of the second vacuum switch is contrary to an output predicted in accordance with the output of the first vacuum switch and the throttle switch on the basis of the predetermined relationship, whereby the diagnosing apparatus does not diagnose any of three switches as out of order when the engine revolution number is within the first range.

* * * * *